United States Patent [19]

Van Gompel

[11] 4,350,359

[45] Sep. 21, 1982

[54] SIDE CAR ATTACHMENT FOR A MOTORCYCLE

[76] Inventor: James J. Van Gompel, Rte. 1, Box 215A, Fremont, Ind. 46737

[21] Appl. No.: 176,026

[22] Filed: Aug. 7, 1980

[51] Int. Cl.³ ............................................. B62K 27/12
[52] U.S. Cl. ..................................... 280/203; 280/473;
    280/491 B; 296/78.1
[58] Field of Search ............... 280/203, 204, 473, 472,
    280/491 B; 296/78.1

[56] References Cited

U.S. PATENT DOCUMENTS

| | | | |
|---|---|---|---|
| 1,311,816 | 4/1919 | Heintz | 280/204 |
| 1,527,096 | 2/1925 | Underwood | 280/203 |
| 1,633,279 | 1/1927 | Scala | 280/203 |
| 2,370,988 | 3/1945 | Neal | 280/334 |
| 2,702,196 | 2/1955 | Gamaunt | 280/203 |
| 2,865,656 | 12/1958 | Musgrave | 280/203 |
| 3,498,633 | 3/1970 | Hopkins | 280/203 X |
| 3,734,536 | 6/1973 | Dever et al. | 280/204 |
| 3,941,405 | 3/1976 | Vetter | 280/203 |
| 3,994,507 | 11/1976 | Doll et al. | 280/203 |
| 4,022,483 | 5/1977 | Wallick et al. | 280/203 |
| 4,073,503 | 2/1978 | Hokans | 280/203 |

FOREIGN PATENT DOCUMENTS

| | | | |
|---|---|---|---|
| 821313 | 12/1937 | France | 280/203 |
| 413188 | 3/1946 | Italy | 280/203 |
| 212098 | 10/1940 | Switzerland | 280/203 |
| 412902 | 7/1934 | United Kingdom | 280/203 |
| 489672 | 1/1976 | U.S.S.R. | 280/203 |
| 509486 | 10/1976 | U.S.S.R. | 280/203 |

Primary Examiner—John A. Pekar
Attorney, Agent, or Firm—Hill, Van Santen, Steadman, Chiara & Simpson

[57] ABSTRACT

A side car attachment for a motorcycle including a wheeled frame which is attached to the motorcycle frame forward of the engine by a single or primary hitch coupling. The wheeled frame extends laterally outward from the hitch coupling and then rearwardly on one or both sides of the motorcycle frame. The coupling hitch permits the motorcycle to lean when making turns without any corresponding lean of the side car attachment. The hitch coupling also permits the motorcycle to have its longitudinal axis turn about a vertical axis by a limited amount to give the driver a feeling of independence in spite of the presence of the side car in that the turning radius and leaning are not significantly restricted. The hitch coupling also permits a user to rapidly connect or disconnect the side car from the motorcycle without tools.

16 Claims, 19 Drawing Figures

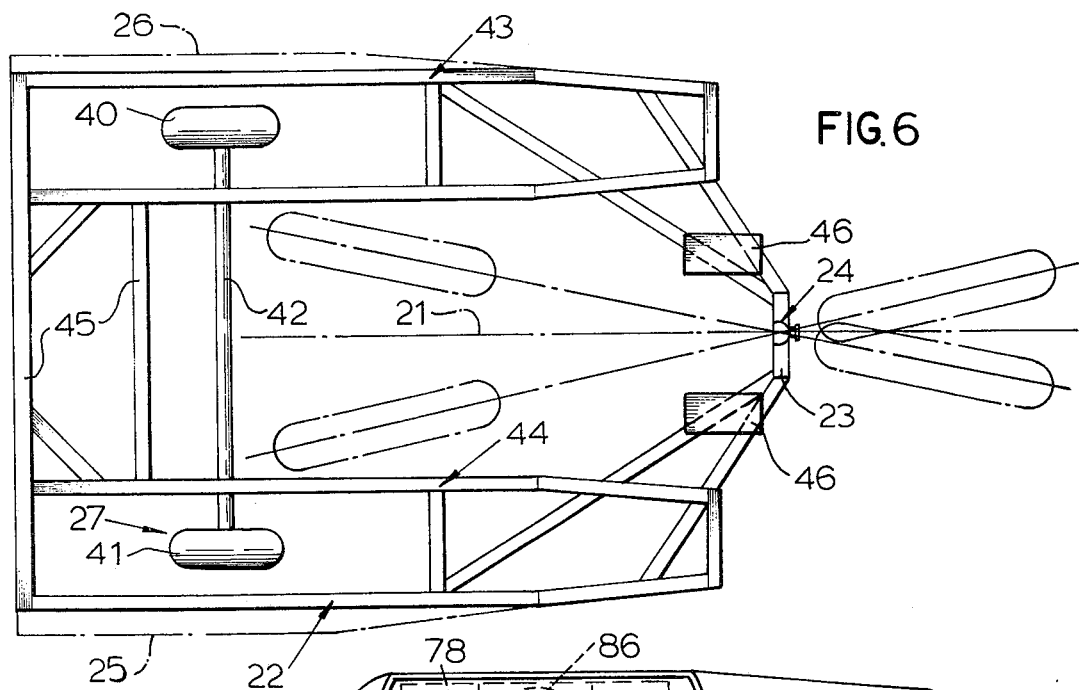
FIG. 6
FIG. 19
FIG. 7
FIG. 5
FIG. 4
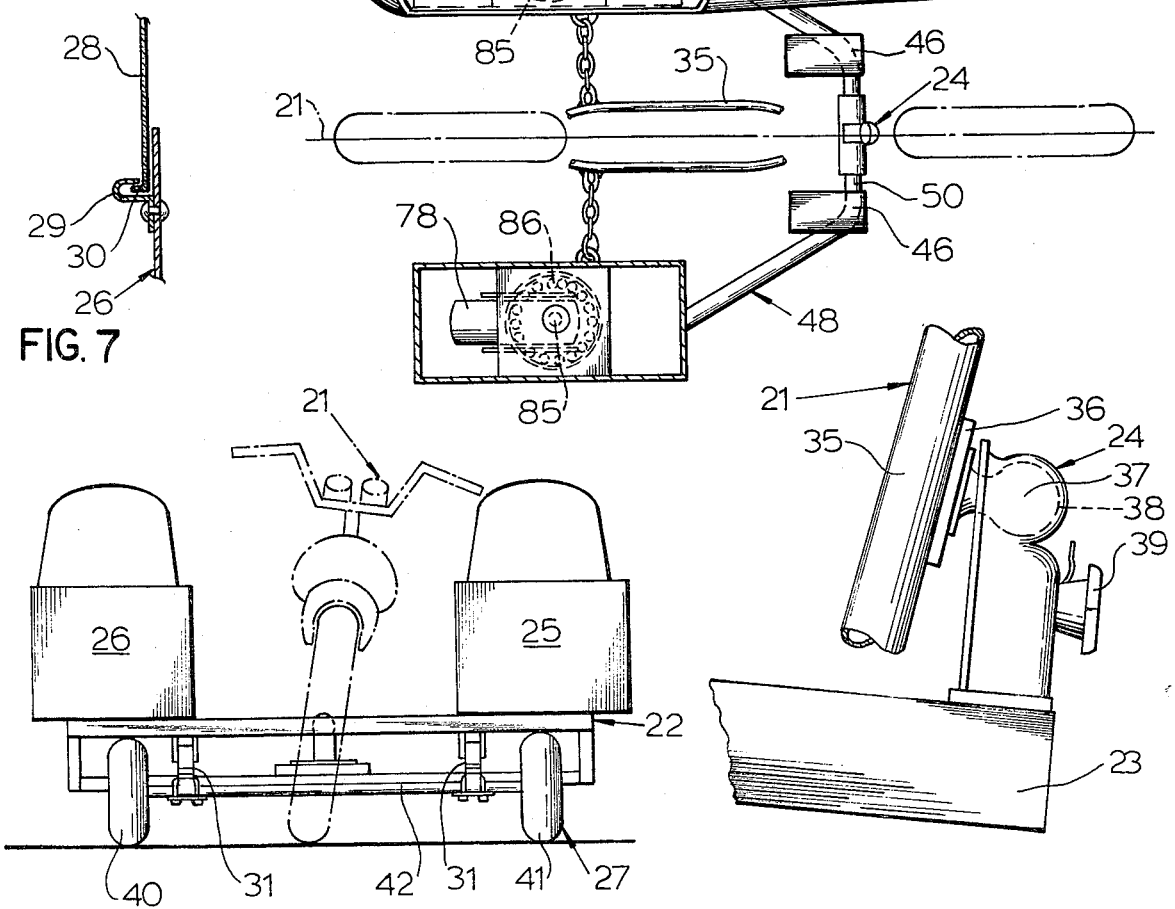

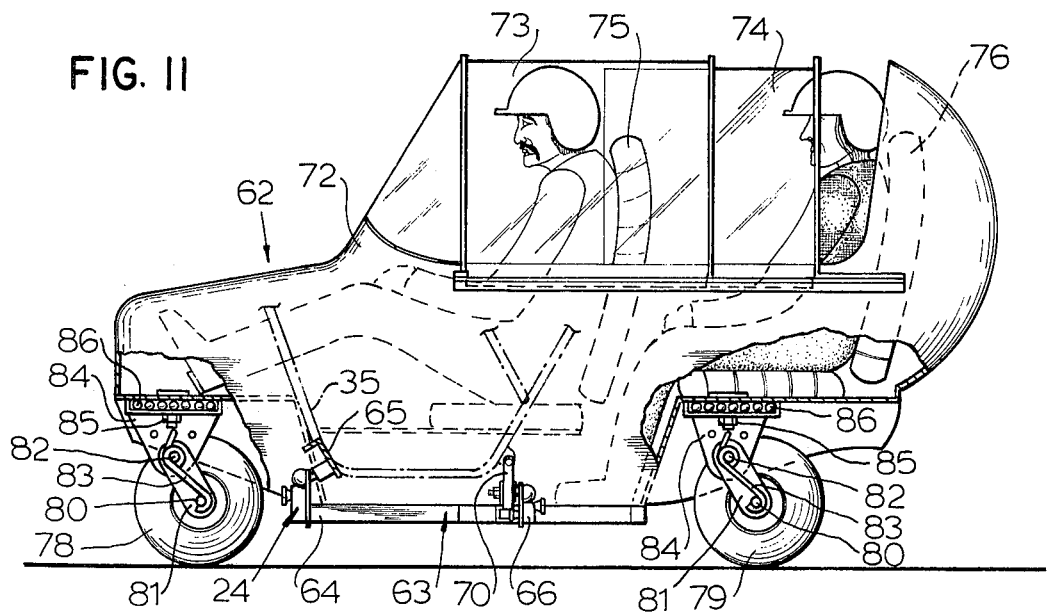
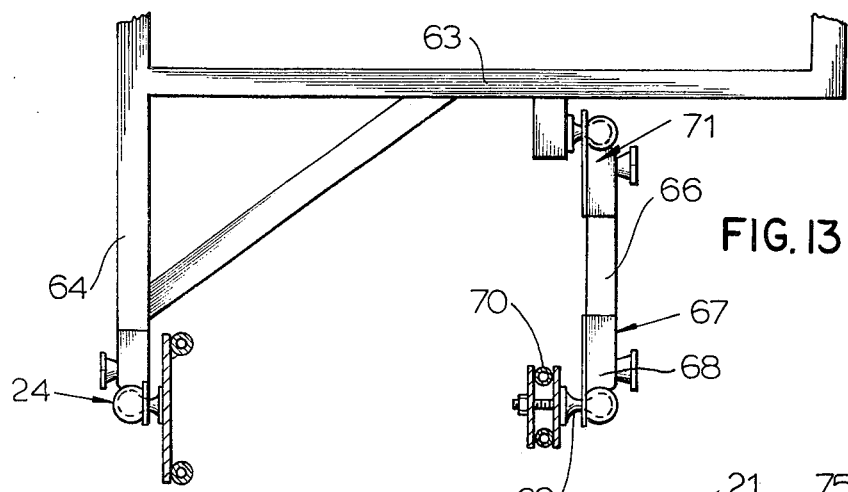
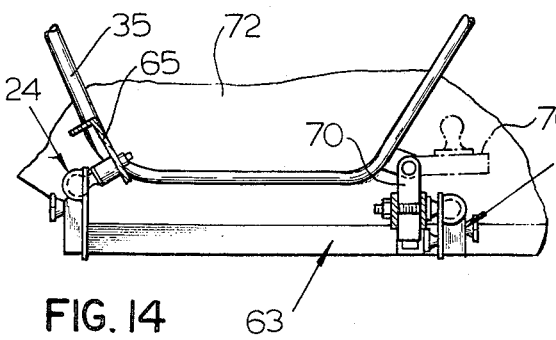
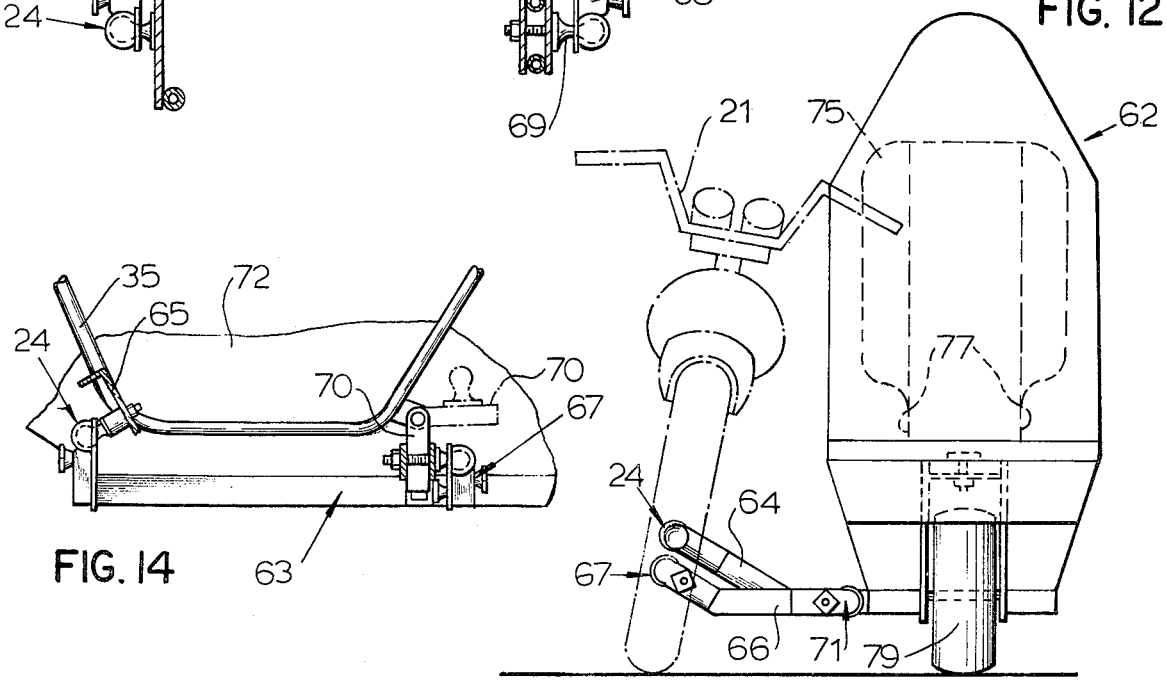

SIDE CAR ATTACHMENT FOR A MOTORCYCLE

BACKGROUND OF THE INVENTION

1. Field of the Invention

This invention relates to a wheeled side car which is adapted to be readily attached and detached from a motorcycle.

2. Prior Art

A typical prior side car, when attached to a motorcycle, typically makes the combined vehicle a "three wheeler" which steers and handles much like a child's tricycle. Thus the attachment of the side car removes the ability of the driver to lean the motorcycle at an angle from vertical when making turns. Thus there is destroyed much of the normal feel of handling the vehicle. Further, where some type of leaning capability has been provided by special structure, the structure is rather complex and as such causes the time required to make a disconnection or a reconnection to be burdensome. Further, when disconnected, prior devices have left a substantial amount of adaptor structure secured to the motorcycle which, in many instances, can cause interference with objects in the terrain. Further, with some prior structures there has been a capability of jackknifing, for instance when the side car was in the nature of a trailer connected to the rear of the motorcycle. Further, the amount of carrying capability that prior devices have had is inherently limited.

SUMMARY OF THE INVENTION

The present invention is directed to a side car attachment for a motorcycle which has its sole or primary attachment located ahead of the motorcycle engine. The attachment is provided by a hitch coupling attached to the leading end of the side car frame, and the frame extends laterally and rearwardly therefrom in spaced relation to the motorcycle, and the hitch coupling enables the driver to lean the motorcycle when making turns without producing any corresponding lean in the side car attachment. In response to turning, the motorcycle may also have its longitudinal axis turn about a vertical axis by a limited amount to give the driver a feel of independence in spite of the presence of the car in that the turning radius and leaning are not significantly restricted. This result has been obtained coupled with a capability of the user to connect and disconnect the side car rather rapidly from the motorcycle without use of any tools. The arrangement of the side car frame also protects the driver's legs from being attacked by dogs. Further, the structural arrangement is such that when attached to the relatively large present day motorcycles, the structure does not interfere with the manifolds and mufflers of the motorcycle.

Accordingly, it is an object of the present invention to provide a side car attachment for a motorcycle that can be easily and rapidly connected thereto and disconnected therefrom.

A further object of the present invention is to provide such a side car attachment devoid of any jackknifing capability.

A further object of the present invention is to provide such an attachment so that the driver of the motorcycle is given a feeling of operating the motorcycle independently without significant interference with operation by the presence of the side car.

Yet another object of the present invention is to provide a side car attachment which has the capability of being installed on virtually any two-wheel motorcycle in spite of the presence of bulky space-occupying manifolds and mufflers.

A still further object of the present invention is to provide the capability of converting a motorcycle into a family vehicle.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

ON THE DRAWINGS

FIG. 4 is an enlarged fragmentary side elevational view of the structure of FIG. 3;

FIG. 5 is a rear elevational view of the side car attachment of FIG. 1, the motorcycle being partially illustrated in phantom lines;

FIG. 6 is a top view of the side car attachment of FIG. 1 with the cabs removed, and the motorcycle being schematically shown in phantom lines;

FIG. 7 is an enlarged fragmentary cross-sectional view taken along line VII—VII of FIG. 1;

FIG. 11 is a side elevational view of a third embodiment of side car attachment, partially broken away and shown in cross-section, a portion of the motorcycle being shown in phantom lines;

FIG. 12 is a rear view of the structure shown in FIG. 11;

FIG. 13 is an enlarged fragmentary top view of a portion of the frame of the embodiment of FIG. 11 showing the connections between the motorcycle and the side car attachment;

FIG. 14 is a side elevational view of the structure of FIG. 13 showing also a fragmentary portion of the cab in the background;

FIG. 19, appearing with FIG. 6, is a modification of FIG. 8.

AS SHOWN ON THE DRAWINGS

Figure 1:
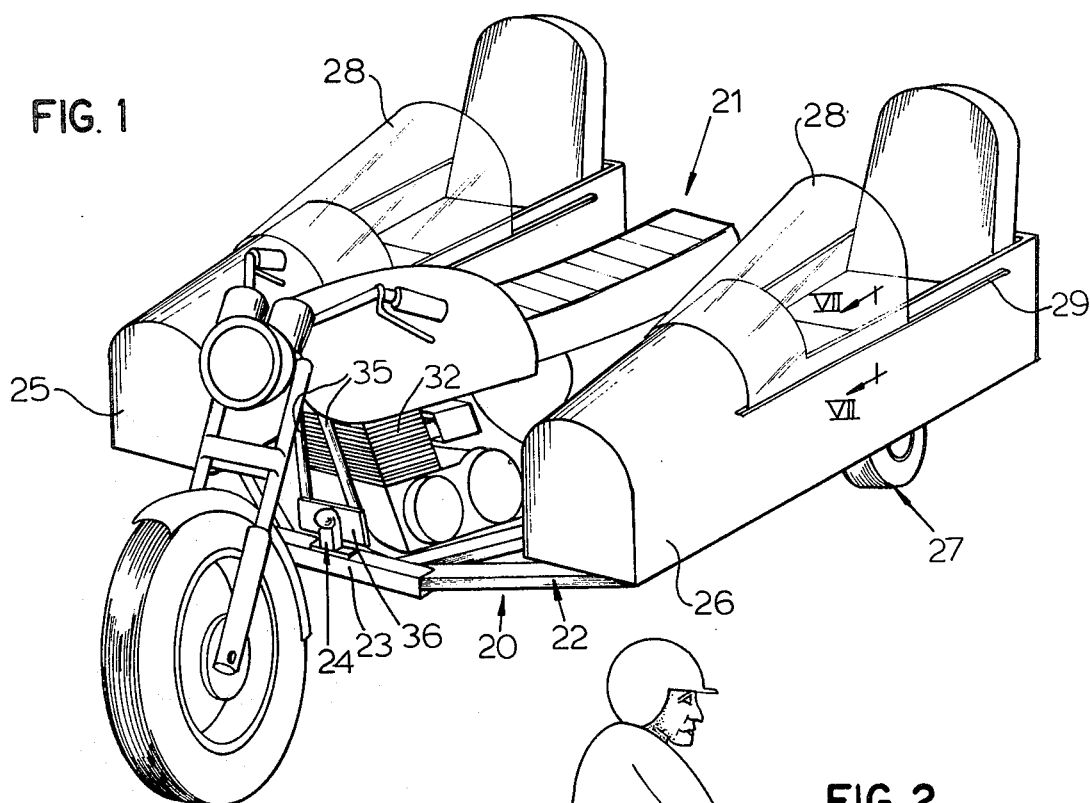
FIG. 1 is a perspective view of a side car attachment secured to a motorcycle and constructed in accordance with the present invention.

One preferred embodiment of a side car attachment for a motorcycle constructed in accordance with the present invention is illustrated in FIG. 1, generally indicated by the numeral 20, the same being shown attached to a motorcycle 21. Side car attachment 20 includes a frame 22 having a leading end 23 on which is carried a hitch coupling 24 which is the sole supporting connection with the motorcycle. The attachment includes at least one and preferably a pair of cabs 25,26 secured to the frame 22, and if desired, the frames of the cabs may be unified with the frame 22. The frame 22 is supported by wheel means 27, there being at least one wheel at each side of the motorcycle, the cabs 25,26 being centered over the wheels. A rigid transparent canopy 28 extends over an upper portion of the cab 25,26 and is supported by a pair of longitudinal tracks 29 respectively disposed on and secured to opposite sides of each of the cabs 25,26. As shown in FIG. 7, the lower longitudinal edges of the canopy 28 extends outwardly as a flange 30, the track 29 having a lower supporting portion extending beneath the flange 30 and an upper trapping portion extending over the flange 30. As the canopy 28 is moved forwardly and rearwardly, an upper portion of the cab 26 becomes exposed or covered respectively.

Terms such as "forwardly", "rearwardly", "ahead", "rear", "longitudinal", and the like are used herein with reference to the normal forward movement of the motorcycle.

Figure 2:
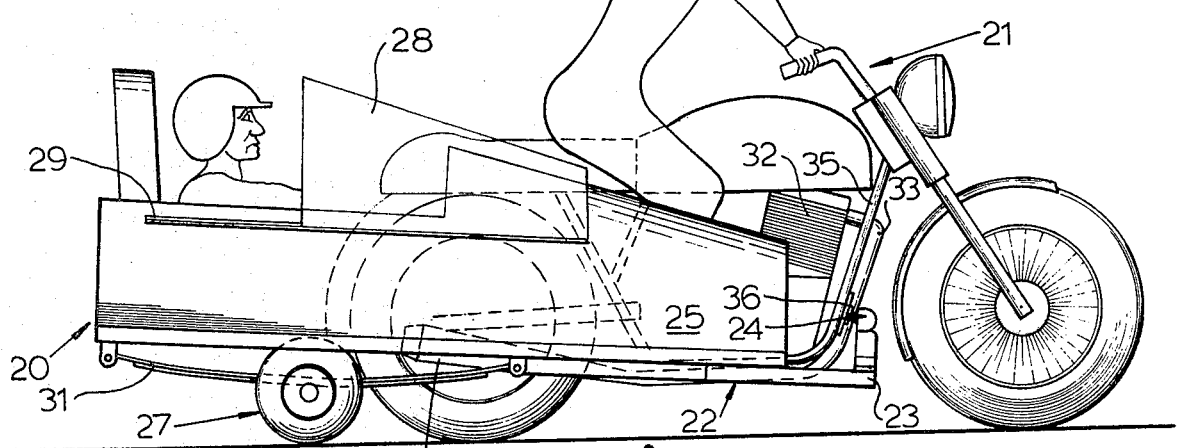
FIG. 2 is a side elevational view of the side car attachment and motorcycle of FIG. 1.

As shown in FIG. 2, the wheel means 27 are secured to a double leaf spring 31 which is secured to the frame 22. The side car attachment 20 is secured to the motorcycle 21 ahead of the engine 32 from which there extends a number of manifolds 33 and mufflers 34, the attachment and arrangement being such that these portions of the motorcycle do not in any way interfere with the side car attachment 20.

Figure 3:
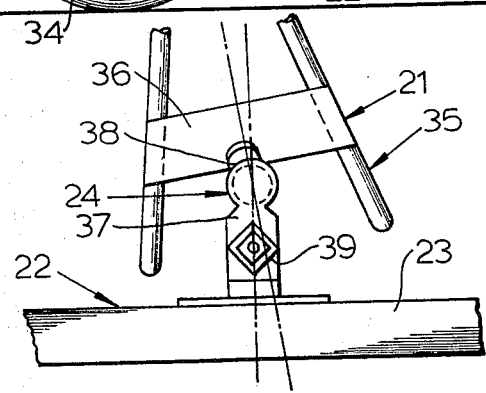
FIG. 3 is an enlarged fragmentary front elevational view of the connection between the side car attachment and the motorcycle.

As shown in each of FIGS. 1, 2 and 3, the motorcycle 21 has a frame which includes a portion 35 which extends in front of the engine 32, and to this portion of the frame there is welded a plate 36. The hitch coupling 24 is of conventional construction and includes a first portion or socket 37 secured to the leading end 23 of the frame 22, and a second portion or ball 38 secured to the plate 36. The portions 37,38 of the hitch coupling 24 are of conventional construction and need no further description, and these are readily detachable from one another and readily reconnectible, such functions being under the control of a locking knob 39 shown in FIG. 3. The connection between the first portion 37 and the leading end 23 is pivotable about a horizontal axis extending perpendicularly to the drawing in FIG. 2, the details of which are functionally equivalent to that described below in relation to FIG. 10. The phantom lines in FIG. 3 denote an angle that the motorcycle 21 is leaning, the frame 22 of the side car attachment remaining horizontal. The first hitch coupling 24 is laterally centered with respect to the motorcycle frame 35, and thus FIG. 3 illustrates that during such leaning, the motorcycle has been pivoted about a longitudinal horizontal axis, such pivoting being enabled by the structure and placement of the hitch coupling 24, and can be in either direction from the vertical. A side elevational view of the attached hitch coupling 24 is shown in FIG. 4.

As illustrated from the rear in FIG. 5, the wheel means 27 support the frame 22 on which the cabs 25,26 are carried. The wheel means 27 includes a pair of wheels 40,41 over which the cabs 26,25 are substantially centered, the wheels 40,41 being interconnected by an axle 42 which is common to both wheels. The double leaf spring 31 is duplicated, one for each cab, and both of these springs interconnect the axle 42 with the frame 22.

As best shown in FIG. 6, the frame 22 has a pair of sides 43,44 which extend laterally and rearwardly from the hitch coupling 24, both sides 43,44 being well spaced from the motorcycle 21. The axle 42, being common to both of the wheels 40,41, is disposed to the rear of the motorcycle 21 but ahead of a rigid portion or portions 45 of the frame which rigidly interconnect the frame sides 43,44. If desired, a pair of flat foot rests 46,46 may be secured to the frame 22 to provide additional alternate supports for the driver's feet. FIG. 6 also illustrates how the motorcycle 21 can turn about a vertical axis with respect to the side car attachment, this capability being also provided by the hitch coupling 24.

If desired, the hitch coupling 24 may be supplemental by a safety chain, not shown.

Figure 8:
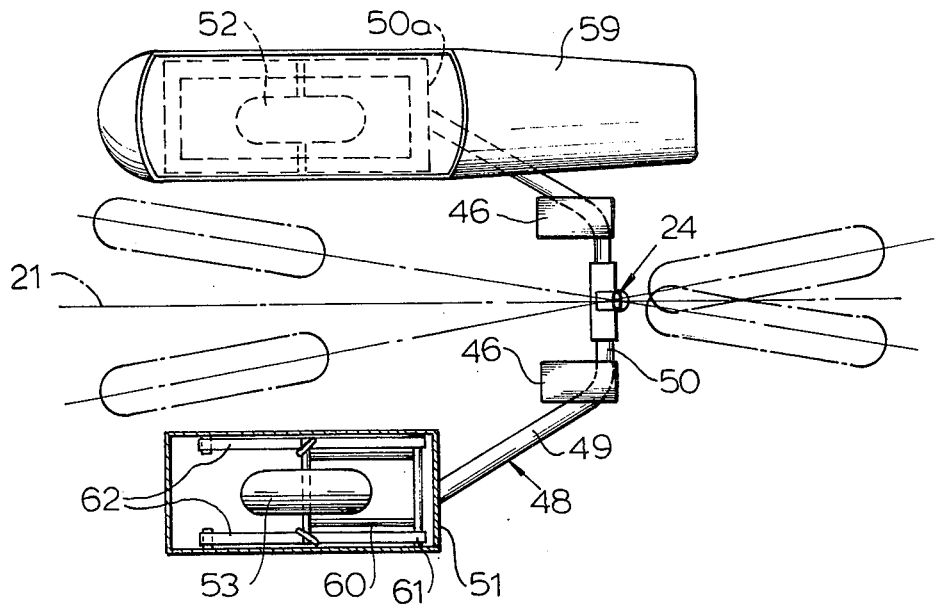
FIG. 8 is a top view of a second embodiment of the invention with one cab removed, and the motorcycle being illustrated schematically by phantom lines.
Figure 9:
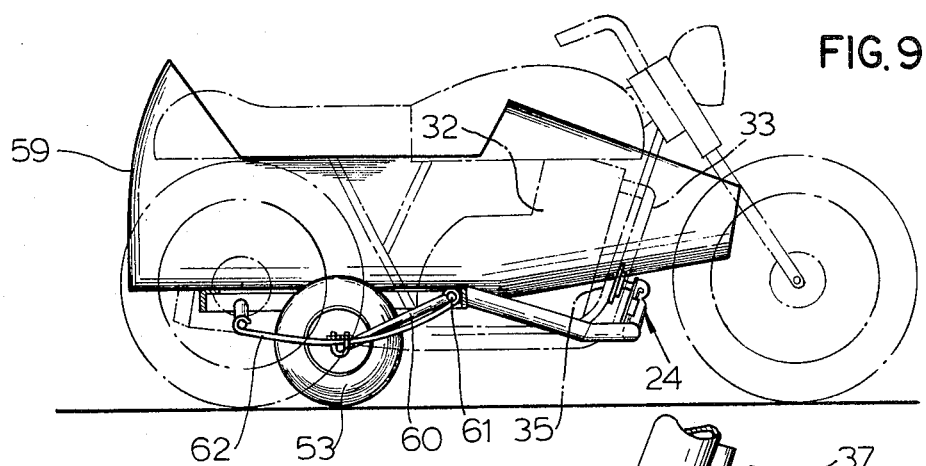
FIG. 9 is a side elevational view of the embodiment of FIG. 8 with the motorcycle shown in phantom lines.
Figure 10:
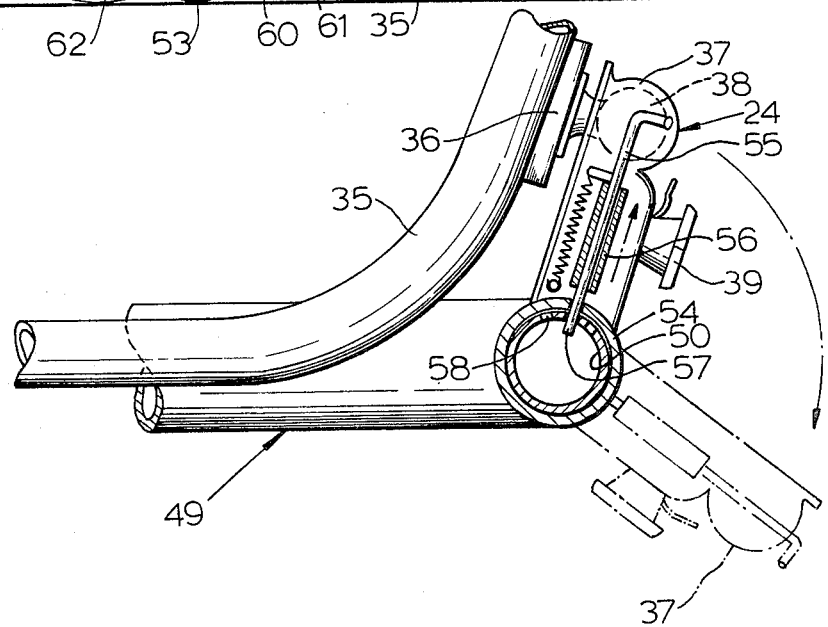
FIG. 10 is an enlarged fragmentary elevational view of a portion of FIG. 9, partly in cross-section showing structure corresponding to that of FIG. 4.
Figure 15:
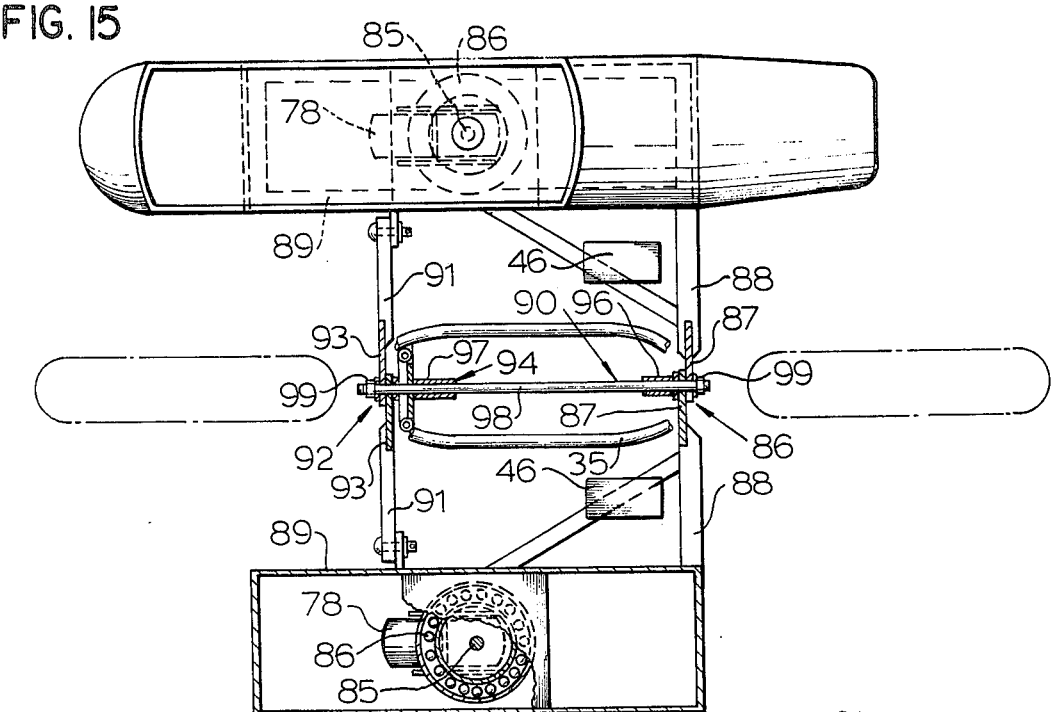
FIG. 15 is a top view of a fourth embodiment of the invention with one cab removed, portions of the motorcycle being shown fragmentarily or in phantom.

As shown in FIGS. 8-10, a second embodiment of the side car attachment 48 includes a frame 49 having a leading end 50 to which the hitch coupling 24 is secured. (Those items having reference numerals smaller than 47 have been described in connection with the embodiment of FIG. 1, and those portions of that description are hereby embodied into the description of this embodiment.) The frame 49 has a pair of sides 50a,51 which extend laterally and rearwardly from the hitch coupling 24, both sides being spaced from the motorcycle 21. In this embodiment, the rigid portions 45 of the frame 22 shown in FIG. 6 have been omitted so that there is no structure lying to the rear of the wheels above their axes and between the sides. In that sense, the frame 49 comprises a horizontal U-shape. In that the wheel means comprises a pair of independently mounted wheels 52,53, there is no structure between the sides 50,51 of the frame 49 to the rear of the motor cycle, and therefore preparatory to coupling, the motorcycle can be driven forwardly into this space from the rear with the front wheel passing over the leading edge 50 and then maneuvered to the point where the hitch coupling portions 37,38 are in substantial alignment for coupling. This type of manuevering is a little easier to do than it is to back in the motorcycle over the leading edge 50, which can also be done, but which is the only way in which the embodiment of FIG. 1 can be conveniently coupled. Such coupling is further facilitated by the fact that the hitch coupling 24 has a pivotal connection with the leading end 50 as shown in FIG. 10. The leading end 50 is a cylindrical portion of the frame around which there is disposed a horizontal tubular member 54, the pivotal connection thus being provided. The first portion or socket portion 37 of the hitch coupling 24 is fixedly secured to the tubular portion 54 so that it can be pivoted between an upright position as shown in solid lines and a lowered position as shown in phantom lines. By this feature, the upwardly projecting portion of the hitch coupling does not interfere with the front wheel of the motorcycle when it is driven in from the rear, and does not interfere with the rear wheel of the motorcycle or any other structure between the wheels when the motorcycle is backed in over the leading end. Means are provided for locking the first portion 37 in the upright position, and such means may have various configurations. In this embodiment, a locking pin 55 is slidably supported on the first portion 37 at 56 and has an end 57 which can enter any one of a number of apertures 58 when aligned therewith. Thus a rather erect position may be selected as shown in FIG. 2, a slightly sloping position may be picked as shown in FIG. 10, and with additional apertures 58 disposed closer to and further from the viewer, the preciseness of the centering of the connection between the side car attachment and the motorcycle may be modified if desired or necessary.

A cab 59 is carried on each of the frame sides 50a,51, the latter being omitted to facilitate illustration of the mounting of the wheels 52,53. The cab 59 may have a canopy as described above, it may be omitted as shown, and may blend in smoothly with the curvature of the rear end of the cab 59 as shown in FIG. 9. Seating may be provided as desired, including either one or two seats in each cab 59.

As shown in each of FIGS. 8 and 9, the wheel 53 has an axle independent of that of the wheel of 52, the wheel and axle being secured to a bracket 60 which is pivoted to the frame side 51 at a point 61 which is forward of and above the axle or turning axis of the wheel 53. The bracket 60 is biased in a downward direction by a spring 62 which may be of the leaf spring type, coil spring type, or torsion spring type.

Tests have shown that the side car attachments that have the single hitch coupling 24 with the motorcycle are easy to handle on the road and that they track or follow the motorcycle well. A 10 percent reduction in fuel economy has been experienced by using a 650cc motorcycle as the motorcycle 21 by testing it both with and without the side car attachment. This decrease in miles per gallon is insignificant when one compares this against the relatively high miles per gallon that the motorcycle is capable of obtaining. Thus a combined vehicle is provided which can be used as a family vehicle, the family being protected against foul weather by using enclosed cabs. Mileage efficiency is maximized by the streamlining of the cabs. There has been no tendency for jackknifing to take place. The time needed for disconnection of the side car attachment from the motorcycle is on the order of 60 seconds and the time needed for connection is only a few seconds longer and depends on the ability of the user to obtain the desired alignment of the hitch coupling portions.

Circumstances can arise where greater roominess in the cab is desired or where it is desired to use only one cab. FIGS. 11–14 illustrate a side car attachment 62 which can be utilized for more roominess, to support greater loads, and which may be utilized alone at one side of the motorcycle or in tandem, one at each side of the motorcycle. Again the side car attachment 62 includes a frame 63 which is provided at its leading end 64 with a hitch coupling 24 secured to the front end 35 of the motorcycle frame as previously described. However, the plate 36 has been modified to use a somewhat more rugged flanged plate or member 65 to compensate for the greater towing force. Where only one side car attachment 62 is utilized, it is necessary to provide a spreader bar 66 having one end pivoted on the frame 62 at a point located to the rear of the leading end 64. A second hitch coupling 67 has a first portion 68 secured to the other end of the spreader bar 66 and a second portion 69 or ball attachable with the first portion and adapted to be connected to the motorcycle at a point to the rear of the engine, but laterally centered. The second portion 69 of the hitch coupling 67 is located substantially at the same height as the other second portion of the hitch coupling 24, the second portion 69 being carried on a truncated portion 70 of a pivotable spring-biased center stand of the motorcycle. The center stand is a conventional feature that normally, when lowered, raises the rear end of the motorcycle slightly to enable parking, service or the like. In the present embodiment, such center stand has been modified by being cut off between its pivot and the distal ends of its legs so that when the same is pivoted to a downward position, there is a substantial clearance between its lower end and the ground. Thus when the side car attachment 62 is detached, the remaining truncated portion swings up as shown in phantom lines in FIG. 14. (If it is desired to restore the normal function of the center stand, the portion or portions which have been cut off being hollow can be reattached by use of appropriate dowel pins.)

Preferably the pivotal connection between the spreader bar 66 and the frame 63 is provided by a third hitch coupling 71 shown to have its first portion connected to the one end of the spreader bar 67 and its second portion fixedly secured to the frame 63.

The side car attachment 62 has a cab 72 provided with a pair of slidable telescoping canopies 73,74 supported on a pair of tracks secured to the sides of the cab. Both are moved to the forward or to the rearward position to gain access to a front seat 75 or a back seat 76. Storage space is provided below the front seat, and storage space is provided to the rear of the back rest of the rear seat 76, such back rest being pivotable to gain such access. As shown in FIG. 12, the lower sides of the back rest of the front seat 75 are cut away as shown at 77 to enable the rear passenger to stretch out his legs along the side of any passenger in the forward seat 75.

The wheel means of the side car attachment 62 comprise a pair of wheels 78,79 arranged in tandem and centered beneath the cab 62 in front and rear wheel wells. The mounting of the wheel 78 is independent of that of the wheel 79, there being an axle 80 for each wheel by which the wheel is mounted on a bracket 81 carried on a pivot 82 which is disposed forward of and above the axle 80. A torsion spring 83 biases the bracket 81 about the horizontal axes at 82. An end of the spring 83 remote from the axle 80 may be placed in any one of several apertures to compensate for load variations. The bracket 81 is supported on the frame 63 and to that end there is an intermediate member 84 disposed between the bracket 81 and the frame 63. A vertical pin 85 is secured to the frame 63 at a point disposed ahead of the axle and about which the intermediate member 84 is pivotable. An axial thrust bearing 86 is disposed between the frame 63 and the intermediate member 84 and extends around the pin 85. By this arrangement, each of the wheels 78,79 can pivot about a vertical axis. By this arrangement, including the hitch couplings, the side car attachment 62 will react properly to the maneuvering of the motorcycle 21, the wheel means compensating for any variations that may be caused by differences in terrain or the slight differences in height between the hitch couplings 24 and 67.

Although the hitch couplings 24, 67 are substantially at the same height, if it is desired to eliminate that difference and make them exactly at the same height, then a further modification of the hitch couplings may be made as shown in a further embodiment illustrated in FIGS. 15-18. In this embodiment, a first hitch coupling 86 has a first portion 87 secured to the leading end 88 of a frame 89, and a second portion 90 which is attachable with each first portion 87 and adapted to be secured to the motorcycle frame 35 ahead of the engine, the same being laterally centered, and defining a horizontal longitudinal pivot axis. The first hitch coupling 86 provides the thrust for the propulsion of the side car attachments. Each side car frame 89 is provided with a spreader bar 91 which has one end pivoted to the frame 89 to the rear of the leading end 88. A second hitch coupling 92 has a first portion 93 secured to the other end of the spreader bar 91, and a second portion 94 that is adapted to be secured to the motorcycle to the rear of the engine in a laterally centered position. The second portion 90 of the hitch coupling 86 and the second portion 94 of the hitch coupling 92 comprise a pair of longitudinally spaced coaxial tubes 96,97 having a common rod 98 extending therethrough with its ends projecting from the portions 87,93. The first portions 87,93 of the hitch couplings 86,92 comprise apertures in the leading ends 88 of the frame and in said other end of the spreader bar 91. A lock 99 is provided at the leading and at the trailing ends of the rod 98.

Figure 16:
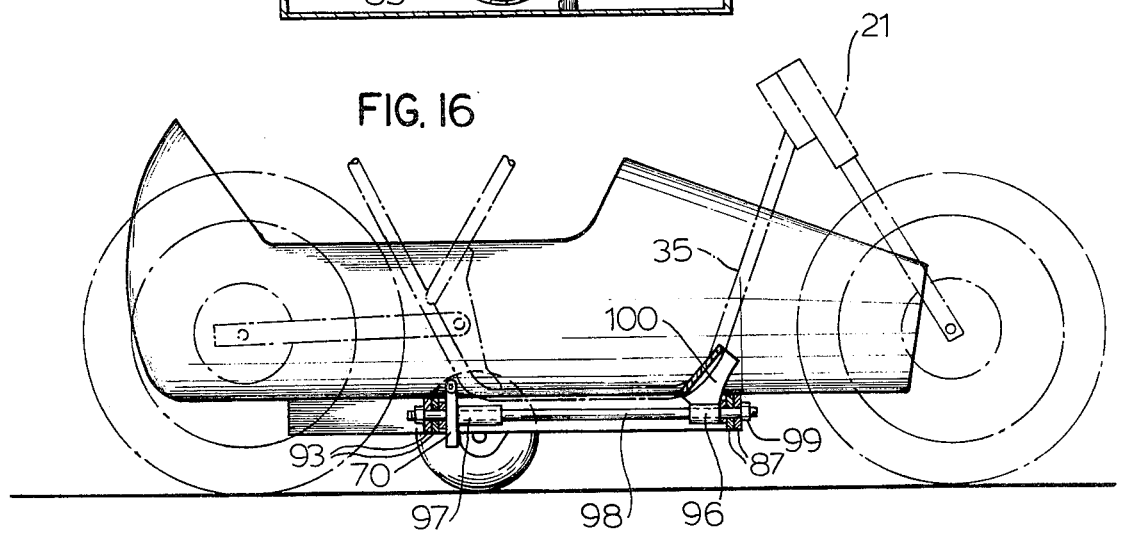
FIG. 16 is a side elevational view of the structure of FIG. 15 with portions broken away and shown in cross-section.

As shown in FIG. 16, the tube 96 is welded to a bracket 100a which is secured to the motorcycle frame 35 in a manner corresponding to the plate 36 of FIG. 3 and the plate 65 of FIG. 11. The tube 97 is secured to the truncated portion 70 of the pivotable spring-biased center stand of the motorcycle as described in relation to FIG. 14.

Figures 17, 18:
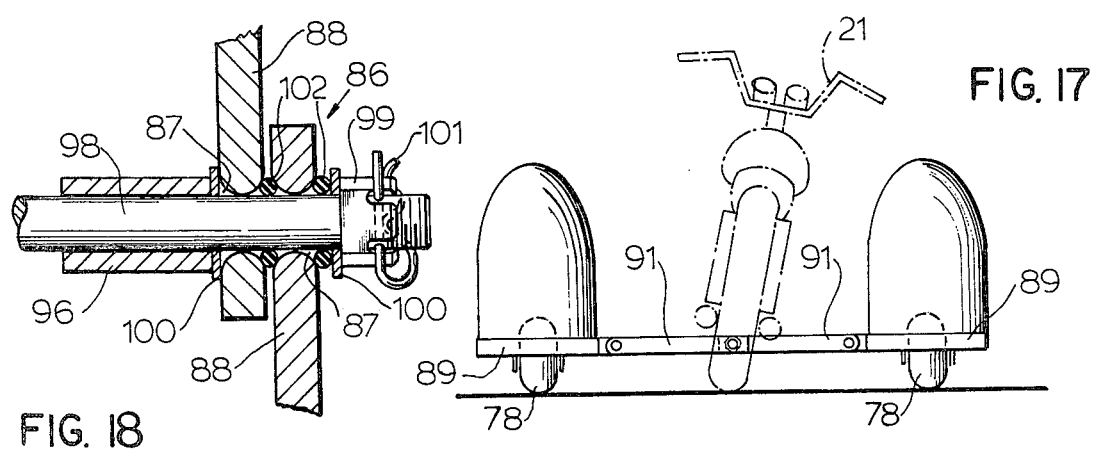
FIG. 17 is a rear elevational view of the structure of FIG. 15.
FIG. 18 is an enlarged view of a fragmentary portion of FIG. 15.

As shown in FIG. 18 the first hitch coupling 86 has the edges that define the apertures 87 rounded to be semi-circular in cross-section and trapped loosely between a pair of washers 100,100. The lock 99 is a castleated nut, there being a series of apertures in the projecting end of the rod 98 through which a spring key 101 may be disposed for locking the lock or lock nut 99 in a selected axial position. A pair of O-rings 102,102 are disposed between the leading ends 88,88 and ahead of the forward leading end 88. This arrangement provides some degree of swivel action which will occur when the side car experiences a different terrain than the motorcycle encounters. In the second hitch coupling 92, the lock 99 is shown to be the same as that shown in FIG. 18. The O-rings 102 keep the parts from rattling and one also keeps the leading ends 88 slightly spaced from each other. The nut 99 shown in FIG. 18 should not be omitted from the first hitch coupling 86 due to the presence of significant thrust thereagainst during braking.

As shown FIG. 19, the embodiment of FIG. 8 has been modified by replacing the wheel means of FIG. 8 with the wheel means of FIG. 11. This arrangement enables the combined vehicle to operate with a somewhat smaller turning radius, which is especially beneficial when movement is in a rearward direction, such as out of a parking place. If desired, the magnitude of such turning can be maximized by a pair of yieldable chains 47,47 respectively connecting the sides 50a,51 of the frame to the motorcycle 21. These chains maximize the magnitude of such turning about the vertical axis. If solid chains 47,47 are used, then just enough slack is provided in each chain so that the chains respectively become taut before the motorcycle engages one of the cabs or frame sides. Alternatively, the chains 47 may include springs (not shown) which virtually eliminate such sag but which yield to an extent corresponding to the taut position of the solid chains.

The taut condition of either chain causes a force to be transmitted to the frame, which in turn causes the wheels to pivot about their vertical axis pins 85, thereby facilitating the tight turn.

Although various minor modifications may be suggested by those versed in the art, it should be understood that I wish to embody within the scope of the patent warranted hereon, all such embodiments as reasonably come within the scope of my contribution to the art.

I claim as my invention:

1. A side car attachment for a motorcycle, said attachment comprising:
   (a) a frame having a leading end for extending horizontally between the wheels of the motorcycle in front of the motorcycle frame;
   (b) wheel means carried by said frame for supporting it; and
   (c) a hitch coupling having a first portion secured to said leading end and extending upwardly therefrom, and a second portion detachably securable to said first portion and adapted to be secured to the motorcycle frame in front of of its engine at a substantially laterally centered position, said hitch coupling enabling pivoting of the motorcycle relative to said frame about both a horizontal longitudinal axis and a vertical axis.

2. A side car attachment according to claim 1, said frame having sides extending laterally and rearwardly from said leading end along substantially the entire length of both lateral sides of the motorcycle frame in spaced relation thereto, said wheel means including at least one wheel at each side of the motorcycle.

3. A side car attachment according to claim 2, including a pair of separate enclosed passenger cabs supported on said frame in spaced relation to the motorcycle and respectively substantially laterally centered over said wheels.

4. A side car attachment according to claim 2, including a pair of flat foot rests fixed to said frame near said leading end, one on each of said sides and disposed to provide the motorcycle driver an alternate position of foot support.

5. A side car attachment according to claim 2, said wheels being independently mounted, and there being an absence of structure extending between said frame sides to the rear of the motorcycle, whereby the motorcycle may be forwardly power-driven between said sides of the uncoupled side car attachment with its front wheel crossing over said leading end to a position of alignment of said coupling portions.

6. A side car attachment according to claim 1, including at least one enclosed passenger cab supported on said frame in spaced relation to the motorcycle and substantially laterally centered over said wheel means.

7. A side car attachment according to claim 6, including a substantially rigid canopy enclosing an upper portion of said cab, and a pair of longitudinally extending tracks respectively secured to opposite sides of said cab and slidably supporting and trapping opposite longitudinal margins of marginal flanges on said canopy, whereby said canopy can be moved longitudinally to expose said upper portion of said cab.

8. A side car atachment for a motorcycle, said attachment comprising:

(a) a frame having a leading end, said frame having sides extending laterally and rearwardly from said leading end along both lateral sides of the motorcycle in spaced relation thereto;

(b) wheel means carried by said frame for supporting it and including at least one wheel at each side of the motorcycle; and (c) a hitch coupling having a first portion secured to said leading end and a second portion detachably securable to said first portion and adapted to be secured to the motorcycle ahead of its engine at a substantially laterally centered position, said hitch coupling being the sole supporting connection to the motorcycle and enabling pivoting of the motorcycle relative to said frame about a horizontal axis during motorcycle leaning and also turning of the motorcycle relative to said frame about a vertical axis.

9. A side car attachment according to claim 8, including a pair of yieldable chains respectively for connecting said sides of said frame to the motorcycle to limit the magnitude of said turning.

10. A side car attachment for a motorcycle, said attachment comprising:

(a) a frame having a leading end, said frame having sides extending laterally and rearwardly from said leading end along both lateral sides of the motorcycle in spaced relation thereto, said frame including a rigid portion interconnecting said sides to the rear of the motorcycle;

(b) wheel means including at least one wheel at each side of the motorcycle;

(c) an axle common to said wheels disposed ahead of and below said rigid portion of said frame and to the rear of the motorcycle;

(d) a pair of spaced springs interconnecting said frame sides with said axle by which said wheel means are carried by said frame; and (e) a hitch coupling having a first portion secured to said leading end and a second portion detachably securable to said first portion and adapted to be secured to the motorcycle ahead of its engine at a substantially laterally centered position, said hitch coupling enabling pivoting of the motorcycle relative to said frame about a horizontal longitudinal axis.

11. A side car attachment for a motorcycle, said attachment comprising:

(a) a frame having a leading end for extending horizontally between the wheels of the motorcycle, said frame having sides extending laterally and rearwardly from said leading end along both lateral sides of the motorcycle in spaced relation thereto;

(b) wheel means carried by said frame for supporting it and including at least one wheel at each side of the motorcycle; and (c) a hitch coupling having a first portion secured by a pivotal connection with said leading end of said frame, said first portion being movable between an upright position and a lowered position, means for locking said first portion in the upright position, and a second portion detachably securable to said first portion and adapted to be secured to the motorcycle ahead of its engine at a substantially laterally centered position, said hitch coupling enabling pivoting of the motorcycle relative to said frame about a horizontal longitudinal axis;

whereby when said coupling portions are detached from each other, and with said first portion being in said lowered position, a wheel of the motorcycle may pass over said leading end without interference.

12. A side car attachment according to claim 11, said pivotal connection including a horizontal tubular member rotatably carried on a cylindrical portion of said leading end of said frame and fixedly secured to said first portion, and said locking means comprising a locking pin slidably received in aligned apertures in said tubular member and said cylindrical portion when said first portion is in said upright position.

13. A side car attachment for a motorcycle, said attachment comprising:

(a) a frame having a leading end;

(b) wheel means carried by said frame for supporting it and being pivotable about a vertical axis;

(c) a hitch coupling having a first portion secured to said leading end and a second portion detachably securable to said first portion and adapted to be secured to the motorcycle ahead of its engine at a substantially laterally centered position, said hitch coupling enabling pivoting of the motorcycle relative to said frame about a horizontal longitudinal axis;

(d) a spreader bar pivotally coupled at one end to said frame rearwardly of said leading end; and (e) a second hitch coupling having a first portion secured to the other end of said spreader bar and a second portion detachably securable to said first portion and adapted to be secured to the motorcycle to the rear of its engine at a substantially laterally centered position at substantially the height of said second portion of said first named hitch coupling.

14. A side car attachment according to claim 13, including a third hitch coupling having first and second separable portions providing the pivotal coupling between said spreader bar and said frame.

15. A side car attachment according to claim 13, said second portion of said second hitch coupling being adapted to be fixedly secured to a previously truncated pivotable spring-biased center stand of the motorcycle, whereby said second portion will swing upwardly when the attachment is disconnected therefrom.

16. A side car attachment according to claim 13, said second portions of said first and second hitch couplings comprising longitudinally spaced coaxial tubes having a rod extending therethrough and projecting therefrom, said first portions of said first and second hitch couplings respectively comprising an aperture in said leading end of said frame and an aperture in said other end of said spreader bar, the projecting ends of said rod extending therethrough, and a lock on each such end.

* * * * *